United States Patent [19]

Bigliani et al.

[11] 4,036,190

[45] July 19, 1977

[54] DEVICE FOR AUTOMATIC CONTROL OF ELECTRONIC SPARK IGNITION ADVANCE FOR INTERNAL COMBUSTION ENGINES

[75] Inventors: Umberto Bigliani, Leumann-Collegno (Turin); Rafael Jacoel, Milan, both of Italy

[73] Assignee: Fiat Societa per Azioni, Turin, Italy

[21] Appl. No.: 684,824

[22] Filed: May 10, 1976

[30] Foreign Application Priority Data

June 10, 1975 Italy .................. 68488/75

[51] Int. Cl.² .............................. F02P 5/04
[52] U.S. Cl. .................. 123/117 D; 123/146.5 A; 340/347 P; 235/150.21; 324/16 T
[58] Field of Search ....... 123/117 D, 117 R, 146.5 A, 123/32 EB, 32 EC; 235/150.1, 151, 150.2; 340/347 P; 328/1, 5, 48; 324/16 T

[56] References Cited

U.S. PATENT DOCUMENTS

| | | | |
|---|---|---|---|
| 3,738,339 | 6/1973 | Huntzinger et al. | 123/117 D |
| 3,904,856 | 9/1975 | Monpetit | 123/32 EB |
| 3,906,205 | 9/1975 | Yoshida et al. | 123/32 EB |
| 3,935,846 | 2/1976 | Zelenka | 123/117 D |
| 3,942,491 | 3/1976 | Seité et al. | 123/117 D |
| 3,998,193 | 12/1976 | Ives et al. | 123/117 D |

*Primary Examiner*—Carroll B. Dority, Jr.
*Assistant Examiner*—Andrew Dolinar
*Attorney, Agent, or Firm*—Sughrue, Rothwell, Mion, Zinn and Macpeak

[57] ABSTRACT

Automatic control of spark advance in an electronic ignition system for an internal combustion engine is effected by using a first electromagnetic pick-up cooperating with a protuberance which is phase-displaced on a rotary part (flywheel) relative to top dead center by the maximum advance angle required, and a second pick-up which cooperates with peripheral teeth on the rotary part. Pulses from the second pick-up are counted during a predetermined interval (T) initiated by a pulse from the first pick-up to provide a count which is stored as a reference value representing the required spark advance angle, this stored reference value being subsequently compared with the number of pulses from the second pick-up counted with the commencement of the next pulse from the first pick-up to provide a spark-triggering pulse upon parity of the number of these subsequently counted pulses with the reference value.

6 Claims, 3 Drawing Figures

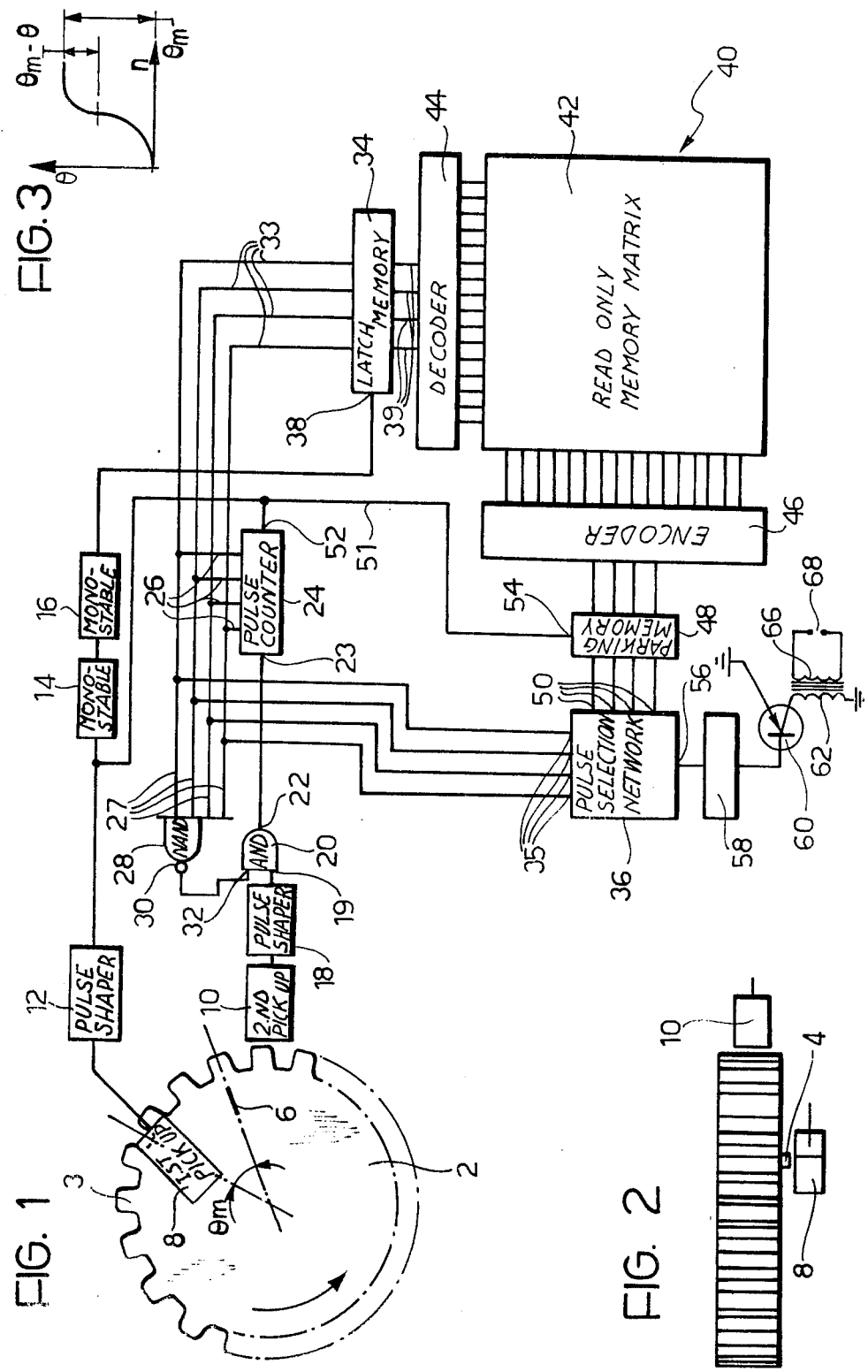

DEVICE FOR AUTOMATIC CONTROL OF ELECTRONIC SPARK IGNITION ADVANCE FOR INTERNAL COMBUSTION ENGINES

The present invention relates to a device for the automatic control of spark advance in an electronic ignition system for internal combustion engines.

Many systems are known for varying the spark advance in electronic ignition systems for internal combustion engines. The present invention relates specifically to electronic systems for automatic variation of the spark advance in an internal combustion engine, which comprise an ignition spark discharge control circuit and a circuit for variation of the instant of discharge, which is itself controlled by reference means located on a rotary part, generally the flywheel, of the internal combustion engine.

The reference means generally consist of at least one protuberance of ferromagnetic material located on the periphery of the rotary part in such a manner as to cause a well-defined variation of magnetic flux detected, for example, by one or more electromagnetic pick-ups which cooperate with the ferromagnetic reference means on the rotary part in such a manner as to detect the rotational speed of the said pare, each pick-up being connected to electronic processing circuits which control each spark discharge so that it occurs at an instant corresponding to a spark advance angle which varies in response to variation of the rotational speed of the engine, possibly according to a predetermined law established expermentally.

Known devices of the above-mentioned type are generally intended to obtain a linear variation of spark advance angle ($\theta$) with variation of engine speed ($n$) until a certain value of spark advances is achieved, which remains constant upon further increase in engine speed.

An object of the present invention is to provide a device for automatic control of spark advance of the aforementioned type, by means of which it is possible to achieve, within certain limits of precision, a predetermined relationship between spark advance angle and engine speed, which may depart from a strictly linear relationship, so as to approximate as closely as possible to a relationship which is optimal for the operation of the engine and which, furthermore, can be varied with relative ease.

A further object of the invention is to provide a device as aforesaid which is particularly capable of effecting digital processing of the engine speed signals with fewer errors than with previously known devices of this type.

The present invention accordingly provides a device for the automatic control of spark advance in an electronic ignition system for an internal combustion engine, of the type comprising an ignition spark discharge control circuit which controls the discharge, reference means located on a rotary part of the engine and comprising a protuberance phase-displaced in advance, with respect to a top dead centre reference on the rotary part, by an angle equal to the maximum spark advance angle required, at least one series of teeth located on the said rotary part and first and second electromagnetic pick-ups which cooperate with the protuberance and with the teeth to provide respective electrical output pulses which are applied to a circuit for varying the instant of discharge, which circuit comprises pulse counter means for counting the pulse emitted by the second pick-up as the teeth pass the said pick-up, in each ignition cycle, for a predetermined time commencing with the passage of the said protuberance past the first pick-up, memory means for storing the count of the counter means after this predetermined time to provide a signal representing a reference value of the required spark advance angle, a parking memory for storing the said reference value, means for resetting the said pulse counter means and clearing the memory means of the said reference value upon the subsequent passage of the said protuberance in correspondence with the said first pick-up, and comparator means for comparing the said reference value stored in the parking memory with the instantaneous count in the pulse counter means after said resetting thereof to initiate operation of a spark discharge circuit when said instantaneous count reaches parity with the reference value.

The invention will now be described, by way of non-limiting example, with reference to the appended drawings, in which:

FIG. 1 is a schematic diagram of a preferred embodiment of the invention;

FIG. 2 is a diagrammatic view illustrating electromagnetic pick-ups employed in the system of FIG. 1, and FIG. 3 is a diagram which relates the speed of the engine and the ignition spark advance angle obtained by means of a device according to the invention.

In the drawings reference numeral 2 indicates a rotary part of an internal combustion engine (not shown) such as, for example, a flywheel, on the periphery of which there is located a toothed ring gear 3, shown only partially in the drawing. The ring gear 3 can be the ordinary starting ring gear of the internal combustion engine. A lateral protuberance 4 is provided on the front face of the flywheel, the protuberance 4 being phase-displaced by an angle $\theta_m$ in advance (that is, in the direction of rotation of the flywheel, indicated by an arrow) with respect to a reference line 6 on the flywheel corresponding to the top dead centre position of the piston in the cylinder in which ignition is to be controlled. The angle $\theta_m$ corresponds to the value of the maximum spark advance angle $\theta$ which it is desired to achieve.

Situated in front of the protuberance 4 is a first electromagnetic pick-up 8 which generates an electromotive pulse when the protuberance 4 passes in front of it.

A second electromagnetic pick-up 10 of the same type as the pick-up 8 is disposed adjacent the edge of the flywheel and cooperates with the teeth of the peripheral ring gear 3.

In FIG. 1 the flywheel is seen from the front, whilst FIG. 2 shows an edge view of the flywheel, with the associated pick-ups 8 and 10, illustrating the relative positions of the latter.

The first pick-up 8 is connected to a pulse shaping circuit 12 the output of which is connected to a first monostable multivibrator 14 which in turn is connected to a second monostable multivibrator 16.

The second pick-up 10 is connected to a pulse shaping circuit 18 the output of which passes to a first input 19 of an AND gate 20 the output 22 of which is connected to the clock input 23 of a pulse counter 24. The outputs 26 of the pulse counter 24, represented in this example as a 4-bit counter, are multiplex and are connected to respective inputs 27 of a NAND gate 28, to respective inputs 33 of a latch type memory 34 (for example the MC 14508 memory made by the Motorola Company) as well as to respective inputs of a pulse selection network 36 constituted, for example, by exclusive OR coincidence circuits. The output 30 of the NAND gate 28 is connected to the second input 32 of the AND gate 20. The latch type memory 34 has an enabling input 38 provided by the output of the second monostable multivibrator 16.

The outputs 39 of the memory 34 are connected to a 'read only' (ROM) memory 40, for example, of the INTEL 1702 type (a re-programmable memory). FIG. 1 shows separately the memory matrix 42 of the memory 40, the decoder 44 through which the memory matrix 42 is connected to the memory 34 and the encoder 46 connects the matrix 42 to a parking memory 48 which is also the latch type. The outputs of the memory 48 constitute respective second inputs 50 of the pulse selection network 36.

The pulse shaper 12 is connected through a lead 51 both to a reset input 52 of the counter 24 and to an enabling input 54 of the parking memory 48.

The output 56 of the pulse selection network 36 passes to the input of a nonstable multivibrator 58 the output of which passes to the base of the transistor 60 including in its collector circuit the primary winding 62 of a transformer constituting the ignition coil of the spark ignition installation to which the invention is applied, the secondary winding 66 of this transformer being connected to a spark gap 68 at which ignition is to occur.

FIG. 1 does not show the biasing circuit elements of the transistor 60.

The operation of the device will now be described with reference to a cycle comprised between two successive passages of the protuberance 4 past the first pick-up 8. When, during the rotation of the flywheel, the protuberance 4 passes beneath the first pick-up 8, the latter emits a pulse which is given a rectangular form by the shaper 12. This pulse passes to the monostable 14 to cause the latter to provide an output pulse of a predetermined duration T. The output pulse of the shaper 12 is also applied to the reset input 52 of the pulse counter 24 which still contains, as will be seen, a count from the preceding cycle, so that the counter 24 is reset to zero. The output pulse of the shaper 12 is also applied to enabling input 54 of the parking memory 48 to cause the ignition pulse to occur at the required time, by means which will be descirbed later.

The second pick-up 10, as a result of the passage in front of it of the teeth of the ring gear 3, produces a series of pulses, one for each tooth, which are subsequently given a rectangular shape in the shaper 18 and are applied to the first input 19 of the AND gate 20. The signal at the second input 32 of the AND gate 20 has logic level 1, so that the AND gate 20 allows the pulses produced by the second pick-up 10 to pass into the pulse counter 24 where they are counted. The value of the count in the counter 24 passes, through the outputs 26 of the counter, to the inputs 27 of the NAND gate 28 and the inputs 33 of the latch type memory 34.

At the end of the predetermined duration T of the output pulse of the monostable 14 the latter is reset and the trailing edge of its output pulse causes setting of the monostable 16 which in turn produces a very short pulse which is applied to the enabling input 38 of the latch type memory 34. The memory 34 is thus enabled to receive and memorise the value of the count reached by the counter 24 during the time T. The number of pulses counted in the time T by the counter 24 will be directly proportional to the speed of rotation of the engine.

Signals representing the value of the count in the counter 24 are taken from the memory 34 through the decoder 44 and applied to the matrix 42 of the ROM memory 40, which constructs a relation, according to a predetermined law, between the various values which its input signal can assume and the corresponding values of its output signal. The predetermined law is established by taking into account the fact that the input signal from the counter 24 is proportional to the engine speed and attributing to the output signal the significance of a signal proportional to the difference between the maximum spark advance angle $\theta_m$ and the angle $\theta$ to be obtained as a function of the speed of rotation of the engine, expressed as revolutions per minute $n$ (see FIG. 3).

Given these premises the predetermined law is selected in such a manner that a correspondence is achieved between the values of the input and output signals of the memory matrix 42 which approximate as closely as possible to the spark advance curve $(n, \theta)$ corresponding to the optimum performance of the engine, this approximation being subject to the accuracy of the device which in turn depends upon the number of bits used (four in this example).

The signals taken from the ROM memory 40 through its coder 46 are applied to the input of the parking memory 48. In the meantime the counter 24 continues its count and its count eventually constitutes an enabling input to the NAND gate 28 and to the pulse selection network 36 when the count in the counter 24 has reached the capacity value of the capacity of the counter, that is to say, when all the bits of the counter 24 are occupied by the binary value 1. The NAND gate 28 sends a zero level signal to the second input 32 of the AND gate 20, which is inhibited, to stop the count, by preventing further pulses from the pick-up 10 reaching the counter 24. The continuation of the count beyond the time T serves to obtain the angular position of the flywheel at which the ignition spark is to occur, s will be apparent later.

At the end of the cycle previously described, that is to say, at the instant corresponding to the next passage of the protuberance 4 in front of the pick-up 10, the pulse shaper 12 applies through the lead 51 an enabling signal to the parking memory 48, causing it to memorise the angular value present as an output signal from the ROM memory 40, and also applies a reset signal to the reset input 52 of the counter 24. The count recorded in the counter 24 during the cycle previously described is cancelled, enabling the counter 24 to commence counting in the next cycle, a count which the ROM memory 40 can memorise, inasmuch as the memory 40 has now been cleared of the previous count, which has passed into the parking memory 48.

The value of the output signal applied by the counter 24 to the pulse selection network 36 is compared in the said network 36 with the value of the output signal emitted in the preceding cycle by the ROM memory 40 and now recorded in the parking memory 48. When these values coincide the pulse selection network 36 provides a pulse at its output 56.

The output pulse from the selection network 36 passes to the input of the monostable multivibrator 58 which provides at its output a negative rectangular pulse of very short duration $t_1$.

The transistor 60 is normally maintained in a conducting state by its biasing circuit elements (not shown) with an almost constant current, so that normally there is no current in the ignition circuit containing the secondary winding 66 and the spark gap 68.

When the negative pulse emitted by the monostable 58 is applied to the base of the transistor 60, the latter is inhibitied for the short duration $t_1$ of the pulse. During this short time interval a current is induced in the transformer primary winding 62, causing a high transient voltage across the secondary winding 66 which in turn causes an ignition spark to leap the spark gap 68. Following this, at the end of the pulse from the monostable 58, the spark ignition circuit returns to its quiescent state in which a constant current flows through the primary winding 62 and the ignition sparks cease.

A device of the type described above is applicable to a four-stroke two cylinder engine, in which there is an ignition spark in each revolution of the engine. Clearly the device can be used for engines having any number of cylinders and strokes, by providing an appropriate number of protuberances similar to the protuberance 4 and suitably phase-displaced relative to each other on the flywheel.

A device has been described employing 4-bit logic elements. Clearly the number of bits employed in the logic elements can be as high as desired, to achieve a greater degree of accuracy as the number of bits increases.

WE claim:

1. Device for the automatic control of spark advance in an electronic ignition system for an internal combustion engine, of the type comprising an ignition spark discharge control circuit which controls the discharge, reference means located on a rotary part of the engine and comprising a protuberance phase-displaced in advance, with respect to a top dead centre reference on the rotary part, by an angle equal to the maximum spark advance angle required, at least one series of teeth located on the said rotary part, first and second electromagnetic pick-ups which cooperate with said protuberance and with said teeth to provide respective electrical output pulses, and a circuit connected to said pick-ups for variation of the instant of discharge, wherein the improvements consists in that the circuit for the variation of the instant of discharge comprises:

pulse counter means for counting the pulses emitted by the second pick-up as said teeth pass the said pick-up, in each ignition cycle, means for enabling said counter for a predetermined period of time (T) commencing with the passage of the said protuberance past the first pick-up, memory means for storing the count of said counter means after this predetermined time (T) and for transforming the count into a signal representing a reference value of the required spark advance angle, a parking memory for storing the said reference value, reset means for resetting the said pulse counter means and clearing the memory means of the said reference value upon the next passage of the said protuberance in correspondence with the said first pick-up, comparator means for comparing the said reference value stored in the parking memory with the instantaneous count in the pulse counter means after said resetting thereof, and a spark discharge circuit connected to said comparator means, the latter initiating operation of said spark discharge circuit when said instantaneous count reaches parity with the reference value.

2. The device claimed in claim 1, wherein the memory means for storing the count of the pulse counter means after the time interval T includes a latch type memory.

3. The device claimed in claim 1, wherein the memory means which transform the count value of the pulse counter means into a signal representing a reference value of the required spark advance angle includes a read only memory.

4. The device claimed in claim 1, wherein the parking memory for storing the said reference value of the spark advance angle comprises a latch type memory.

5. The device claimed in claim 1 wherein the comparator means are constituted by a pulse selection network.

6. The device claimed in claim 5, wherein said pulse selection network is constituted by exclusive OR circuits.

* * * * *